United States Patent
Frampton

(10) Patent No.: US 9,368,972 B2
(45) Date of Patent: Jun. 14, 2016

(54) GENERATOR MANAGEMENT SYSTEM THAT DETERMINES A TIME TO ACTIVATE AND DEACTIVATE GENERATORS BASED ON THE LOAD LEVEL

(75) Inventor: Isaac S. Frampton, Strattanville, PA (US)

(73) Assignee: Kohler Co., Kohler, WI (US)

(*) Notice: Subject to any disclaimer, the term of this patent is extended or adjusted under 35 U.S.C. 154(b) by 776 days.

(21) Appl. No.: 13/559,643

(22) Filed: Jul. 27, 2012

(65) Prior Publication Data

US 2014/0028102 A1   Jan. 30, 2014

(51) Int. Cl.
*H02J 4/00*   (2006.01)
*H02J 3/46*   (2006.01)
*H02J 3/38*   (2006.01)

(52) U.S. Cl.
CPC . *H02J 3/46* (2013.01); *H02J 3/381* (2013.01); *Y10T 307/696* (2015.04)

(58) Field of Classification Search
CPC .................................. H02J 3/381; H02J 3/46
USPC ...................................... 307/34, 80
See application file for complete search history.

(56) References Cited

U.S. PATENT DOCUMENTS

| | | | | |
|---|---|---|---|---|
| 2,546,410 A | * | 3/1951 | Schwendner | H02P 9/00 251/29 |
| 2,832,896 A | * | 4/1958 | Siverts | H02H 7/062 290/4 R |
| 3,300,647 A | * | 1/1967 | Gogia | H02J 3/38 290/30 R |
| 3,489,914 A | * | 1/1970 | Taylor | H02J 3/38 307/59 |
| 4,233,555 A | | 11/1980 | Roche | |
| 4,302,683 A | | 11/1981 | Burton | |
| 4,384,213 A | | 5/1983 | Bogel | |
| 4,405,892 A | | 9/1983 | Staerzl | |
| 4,469,071 A | | 9/1984 | Bassi et al. | |
| 4,625,123 A | | 11/1986 | Gillett et al. | |
| 4,899,706 A | | 2/1990 | Sasaki | |
| 5,252,905 A | | 10/1993 | Wills et al. | |
| 5,256,959 A | | 10/1993 | Nagano et al. | |
| 5,332,927 A | | 7/1994 | Paul et al. | |

(Continued)

FOREIGN PATENT DOCUMENTS

| CN | 201378280 | 1/2010 |
|---|---|---|
| CN | 201378821 | 1/2010 |

(Continued)

OTHER PUBLICATIONS

"U.S. Appl. No. 13/540,118, Final Office Action mailed Sep. 17, 2014", 11 pgs.

(Continued)

*Primary Examiner* — Rexford Barnie
*Assistant Examiner* — Elim Ortiz
(74) *Attorney, Agent, or Firm* — Schwegman, Lundberg & Woessner, P.A.

(57) ABSTRACT

Some embodiments relate to a generator management system 10. The generator management system 10 includes a first generator 11 and a second generator 13. A bus 15 connects at least one of the first generator 11 and the second generator 13 to a load L. A control 16 determines a time delay to (i) connect the first generator 11 and the second generator 13 to the bus 15; and/or (ii) disconnect the first generator 11 and second generator 13 from the bus 15. The control 16 varies the time delay based on the load L supplied by the first generator 11 and the second generator 13.

20 Claims, 2 Drawing Sheets

(56) References Cited

U.S. PATENT DOCUMENTS

| | | | |
|---|---|---|---|
| 5,625,276 A | 4/1997 | Scott et al. | |
| 5,635,768 A | 6/1997 | Birch et al. | |
| 5,694,027 A | 12/1997 | Satake et al. | |
| 5,703,410 A | 12/1997 | Maekawa | |
| 5,730,098 A | 3/1998 | Sasaki et al. | |
| 5,886,890 A | 3/1999 | Ishida et al. | |
| 5,949,153 A * | 9/1999 | Tison | H02J 3/24 307/18 |
| 6,191,500 B1 * | 2/2001 | Toy | H02J 3/46 307/64 |
| 6,313,544 B1 | 11/2001 | Mongia et al. | |
| 6,605,878 B1 | 8/2003 | Arce | |
| 6,657,416 B2 * | 12/2003 | Kern | H02J 9/066 290/40 A |
| 6,844,706 B2 | 1/2005 | Pinkerton, III et al. | |
| 6,894,403 B2 | 5/2005 | Shinogi | |
| 6,923,168 B2 | 8/2005 | Bryde | |
| 7,180,210 B1 | 2/2007 | Jorgenson et al. | |
| 8,049,348 B2 | 11/2011 | Czajkowski | |
| 8,294,431 B2 | 10/2012 | McLean et al. | |
| 8,766,479 B2 | 7/2014 | Dorn et al. | |
| 8,963,349 B2 | 2/2015 | Frampton et al. | |
| 9,197,098 B2 | 11/2015 | Frampton et al. | |
| 2002/0089234 A1 | 7/2002 | Gilbreth et al. | |
| 2002/0134083 A1 | 9/2002 | Staphanos et al. | |
| 2003/0014200 A1 | 1/2003 | Jonker et al. | |
| 2004/0059542 A1 | 3/2004 | Apostolides | |
| 2004/0164618 A1 | 8/2004 | Bryde | |
| 2005/0184589 A1 * | 8/2005 | Fujita | B63J 3/04 307/19 |
| 2006/0244327 A1 | 11/2006 | Kundel | |
| 2007/0262661 A1 | 11/2007 | Ai | |
| 2009/0012653 A1 | 1/2009 | Cheng et al. | |
| 2009/0164806 A1 * | 6/2009 | Dishman | G06F 1/26 713/300 |
| 2010/0094490 A1 * | 4/2010 | Alston | B63H 21/17 701/21 |
| 2010/0102637 A1 * | 4/2010 | Dozier | H02J 3/46 307/84 |
| 2010/0156191 A1 | 6/2010 | Dozier et al. | |
| 2010/0207454 A1 * | 8/2010 | Jagota | H02J 1/10 307/80 |
| 2010/0269776 A1 | 10/2010 | Mizuno | |
| 2011/0130917 A1 | 6/2011 | Genssle et al. | |
| 2011/0149624 A1 | 6/2011 | Yamanaka | |
| 2011/0272952 A1 | 11/2011 | Richardson et al. | |
| 2011/0291411 A1 | 12/2011 | Folken | |
| 2012/0007431 A1 | 1/2012 | Jang et al. | |
| 2012/0049638 A1 | 3/2012 | Dorn et al. | |
| 2012/0242451 A1 | 9/2012 | Tanaka et al. | |
| 2014/0001769 A1 | 1/2014 | Frampton et al. | |
| 2014/0001868 A1 | 1/2014 | Frampton et al. | |
| 2014/0001873 A1 | 1/2014 | Tian et al. | |
| 2014/0002032 A1 | 1/2014 | Frampton et al. | |
| 2014/0210256 A1 | 7/2014 | Raats et al. | |
| 2014/0309797 A1 | 10/2014 | Frampton et al. | |
| 2015/0115745 A1 | 4/2015 | Wang et al. | |

FOREIGN PATENT DOCUMENTS

| | | |
|---|---|---|
| CN | 201781325 A | 3/2011 |
| CN | 102474450 | 5/2012 |
| EP | 1006641 A2 | 6/2000 |
| WO | WO-2008/130968 A1 | 10/2008 |
| WO | WO-2012/030947 A1 | 3/2012 |
| WO | WO-2012/154451 A2 | 11/2012 |

OTHER PUBLICATIONS

"U.S. Appl. No. 13/540,118, Non Final Office Action mailed Mar. 16, 2015", 15 pgs.

"U.S. Appl. No. 13/540,118, Non Final Office Action mailed May 14, 2014", 11 pgs.

"U.S. Appl. No. 13/540,118, Response filed Aug. 13, 2014 to Non Final Office Action mailed May 14, 2014", 7 pgs.

"U.S. Appl. No. 13/540,118, Response filed Dec. 12, 2014 to Final Office Action mailed Sep. 17, 2014", 13 pgs.

"U.S. Appl. No. 13/540,146, Non Final Office Action mailed Mar. 11, 2014", 7 pgs.

"U.S. Appl. No. 13/540,146, Non Final Office Action mailed Jul. 14, 2014", 8 pgs.

"U.S. Appl. No. 13/540,146, Notice of Allowance mailed Nov. 14, 2014", 8 pgs.

"U.S. Appl. No. 13/540,146, Response filed Jun. 9, 2014 to Non Final Office Action mailed Mar. 11, 2014", 8 pgs.

"U.S. Appl. No. 13/540,146, Response filed Oct. 10, 2014 to Non Final Office Action mailed Jul. 14, 2014", 7 pgs.

"Chinese Application Serial No. 201310271829.0, Office Action mailed Feb. 27, 2015", (w/ English Translation), 19 pgs.

"European Application No. 13003307.9, Response filed Jul. 2, 2014 to European Sesrch Report dated Sep. 26, 2013", 17 pgs.

"European Application No. 13003380.6, Response filed Sep. 17, 2014 to European Search Report dated Feb. 17, 2014", 18 pgs.

"European Application No. 13003307.9, Extended European Search Report dated Sep. 26, 2013", 8 pgs.

"U.S. Appl. No. 13/540,118, Notice of Allowance mailed Jul. 22, 2015", 16 pgs.

"European Application Serial No. 15155923, Extended European Search Report mailed Aug. 7, 2015", 6 pgs.

"U.S. Appl. No. 13/540,118, Examiner Interview Summary mailed Jun. 10, 2015", 3 pgs.

"U.S. Appl. No. 13/540,118, Response filed Jun. 15, 2015 to Non Final Office Action mailed Mar. 16, 2015", 9 pgs.

"U.S. Appl. No. 13/540,133, Non Final Office Action mailed Jul. 8, 2015", 13 pgs.

"Chinese Application Serial No. 201310261793.8, Office Action mailed Mar. 23, 2015", (w/ English Summary), 11 pgs.

"U.S. Appl. No. 13/540,118, Corrected Notice of Allowance mailed Aug. 31, 2015", 2 pgs.

"U.S. Appl. No. 13/540,118, Notice of Allowability mailed Aug. 20, 2015", 2 pgs.

"U.S. Appl. No. 13/540,133, Response filed Sep. 15, 2015 to Non Final Office Action mailed Jul. 8, 2015", 13 pgs.

Chinese Application Serial No. 20130311755.9, Office Action mailed Aug. 21, 2015, (w/ English Translation), 11 pgs.

European Application No. 13003380.6, European Search Report dated Feb. 17, 2014, 9 pgs.

U.S. Appl. No. 13/540,133, Examiner Interview Summary mailed Jan. 12, 2016, 3 pgs.

U.S. Appl. No. 13/540,133, Final Office Action mailed Nov. 18, 2015, 13 pgs.

U.S. Appl. No. 13/540,133, Notice of Allowance mailed Feb. 1, 2016, 7 pgs.

U.S. Appl. No. 13/540,133, Response filed Jan. 5, 2016 to Final Office Action mailed Nov. 18, 2015, 8 pgs.

Chinese Application No. 201310269144.2, First Office Action dated Jul. 3, 2015, 9 pgs.

Chinese Application No. 201310311755.9, First Office Action dated Aug. 21, 2015, 11 pgs.

* cited by examiner

GENERATOR MANAGEMENT SYSTEM THAT DETERMINES A TIME TO ACTIVATE AND DEACTIVATE GENERATORS BASED ON THE LOAD LEVEL

TECHNICAL FIELD

Embodiments pertain to a generator management system that activates and deactivates generators, and more particularly to a generator management system that determines a time to activate and deactivate generators based on a load level on the generators.

BACKGROUND

Electric generators are typically used to provide electrical power. One common use of electric generators is as a standby power source.

One common type of electric generator includes an internal combustion. The internal combustion engine drives an electrical alternator that produces alternating electricity.

Many existing system often include multiple electric generators, especially in situations where there is a potential high demand for power. There can be advantages to employing multiple small generators rather than a single large generator.

One of the advantages is that if one generator fails, or requires maintenance, a multi-generator system can still supply some power while a single generator system would otherwise not be able to meet demand. Another advantage is that load growth may be addressed by adding another generator rather than replacing an existing generator with a larger (and more expensive) generator.

Existing generator management systems start and stop generators based on the varying requirements of the load. The load must remain above a threshold for a fixed amount of time before an additional generator is started and connected to the bus. The load must remain below a threshold for a fixed amount of time before a generator is disconnected from the bus and stopped.

One of the drawbacks with existing generator management systems is that the delay that is specified to connect or disconnect one of the generators is a fixed amount of time. Connecting or disconnecting one of the generators according to a fixed amount of time often requires relatively long start delays to avoid undesired generator starting. These relatively long start delays can result in an overload condition of the generator that are connected to the bus because an additional generator does not start quickly enough.

In some existing systems, this drawback is addressed by establishing an overload threshold. When this overload threshold is reached, the generator management system starts all of the currently not operating generators and connects them to the bus.

There are drawbacks associated with utilizing an overload threshold to start all of the generators without regard to the actual power that is required by the load. One of the drawbacks is that there can be unnecessary starting of the generators, which results in excessive fuel consumption and undesired wear and tear on the generators.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
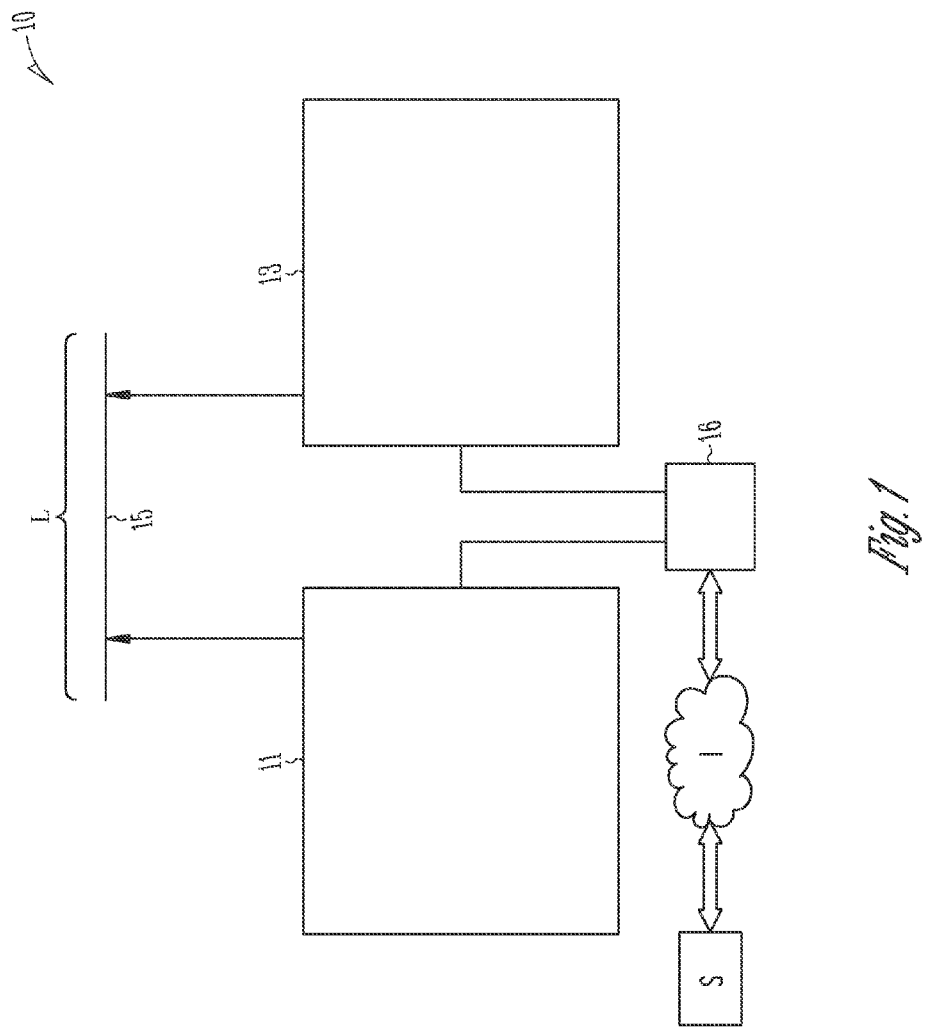
FIG. 1 illustrates an example generator management system that includes a first generator and a second generator.

FIG. 1 illustrates an example generator management system 10. The generator management system 10 includes a first generator 11 and a second generator 13. A bus 15 connects at least one of the first generator 11 and the second generator 13 to a load L.

A control 16 determines a time delay to (i) connect the first generator 11 and the second generator 13 to the bus 15; and/or (ii) disconnect the first generator 11 and second generator 13 from the bus 15. The control 16 varies the time delay based on the load L supplied by the first generator 11 and the second generator 13.

In some embodiments, the control 16 determines the time delay to connect at least one of the first generator 11 and the second generator 13 based on a factor that is proportional to the reciprocal of the square of the difference between the load L supplied by the first generator 11 and the second generator 13 and a set point stored in the control 15. Determining the time delay in this manner may match the overload characteristics of the first generator 11 and the second generator 13 for a connected load L.

In alternative embodiments, the control 16 determines the time delay to connect at least one of the first generator 11 and the second generator 13 based on a factor that is proportional to the difference between a set point stored in the control 16 and the load L supplied by the first generator 11 and the second generator 13. Determining the time delay in this manner may improve the coordination with simple time based load controlling devices (e.g., load control systems).

In still other embodiments, the control 16 determines the time delay to connect at least one of the first generator 11 and the second generator 13 by obtaining a time delay from a predetermined set of data stored within the control 16 based on the load L supplied by the first generator 11 and the second generator 13. Determining the time delay in this manner may allow for the direct use of overload data that is associated with at least one of the first generator 11 and the second generator 13.

In one example embodiment, the control 16 may increase the time delay to connect at least one of the first generator 11 and the second generator 13 as the load L supplied by the first generator 11 and the second generator 13 decreases. In another example embodiment, the control 16 may decrease the time delay to connect at least one of the first generator 11 and the second generator 13 as the load L supplied by the first generator 11 and the second generator 13 increases.

It should be noted that other embodiments are contemplated where the time delay to connect at least one of the first generator 11 and the second generator 13 varies according to the particular needs of the generator management system 10. The method in which the time delay is determined will depend in part (i) the types of load in the generator management system 10; (ii) how quickly each of the first and second generators 11, 13 can be connected to the bus 15; and/or (iii) the cycle life of the means for connecting each of the first and second generators 11, 13 to the bus (e.g., a circuit breaker) (among other factors).

In some embodiments, the control 16 determines the time delay to disconnect at least one of the first generator 11 and the second generator 13 based on a factor that is proportional to the square of the difference between the load L supplied by the first generator 11 and the second generator 13 and a set point stored in the control 16. Determining the time delay in this manner may allow for coordination with downstream over-current devices (e.g. fuses).

In alternative embodiments, the control 16 determines the time delay to disconnect at least one of the first generator 11 and the second generator 13 based on a factor that is proportional to the difference between the load supplied by the first generator 11 and the second generator 13 and a set point stored in the control 16. Determining the time delay in this manner may improve the coordination with simple time based load controlling devices (e.g., load control systems).

In still other embodiments, the control 16 determines the time delay to disconnect at least one of the first generator 11 and the second generator 13 by obtaining a time from a predetermined set of data stored within the control 16 based on the load L supplied by the first generator 11 and the second generator 13. Determining the time delay in this manner may allow for the direct use of load profile data for load L.

In one example embodiment, the control may increase the time delay to disconnect at least one of the first generator 11 and the second generator 13 as the load L supplied by the first generator 11 and the second generator 13 increases. In another example embodiment, the control 16 may decreases the time delay to disconnect at least one of the first generator 11 and the second generator 13 as the load L supplied by the first generator 11 and the second generator 13 decreases.

It should be noted that other embodiments are contemplated where the time delay to disconnect at least one of the first generator 11 and the second generator 13 varies according to the particular needs of the generator management system 10. The method in which the time delay is determined will depend in part on (i) the types of load in the generator management system 10; (ii) how quickly each of the first and second generators 11, 13 can be connected to the bus 15; and/or (iii) the cycle life of the means for connecting each of the first and second generators 11, 13 to the bus (e.g., a circuit breaker) (among other factors).

Other embodiments are contemplated where the control 16 determines the time delay to connect the first generator 11 and second generator 13 to the bus 15 and disconnect the first generator 11 and second generator 13 from the bus. As an example, the control 16 may vary the time delay based on a difference between the load L supplied by the first generator 11 and the second generator 13 and a set point stored within the controller 16.

It should be noted that the set point stored within the control 16 may be a load level. In addition, although other set points are contemplated, the set point stored within the control 16 may be a percentage of a maximum output capacity of the first generator 11 and the second generator 13.

In some embodiments, the control 16 also controls the operating parameters of at least one of the first generator 11 and the second generator 13 (i.e., the controller 16 is a generator controller for one or both of the first generator 11 and the second generator 13). It should be noted that other embodiments are contemplated where the control 16 is part of another component that forms the generator management system 10 or functions as a stand-alone device.

FIG. 1 shows that the control 16 may be connected to a network (e.g., the Internet I) such that as server S may be able to remotely change operating parameters of at least one of the first generator 11 and the second generator 13 based on data received over the Internet I. As an example, changing the operating parameters of the first generator 11 and the second generator 13 may include changing the factors that determine the time delay to connect at least one of the first generator 11 and the second generator 13 to the bus 15 and disconnect at least one of the first generator 11 and the second generator 13 from the bus 15.

Figure 2:
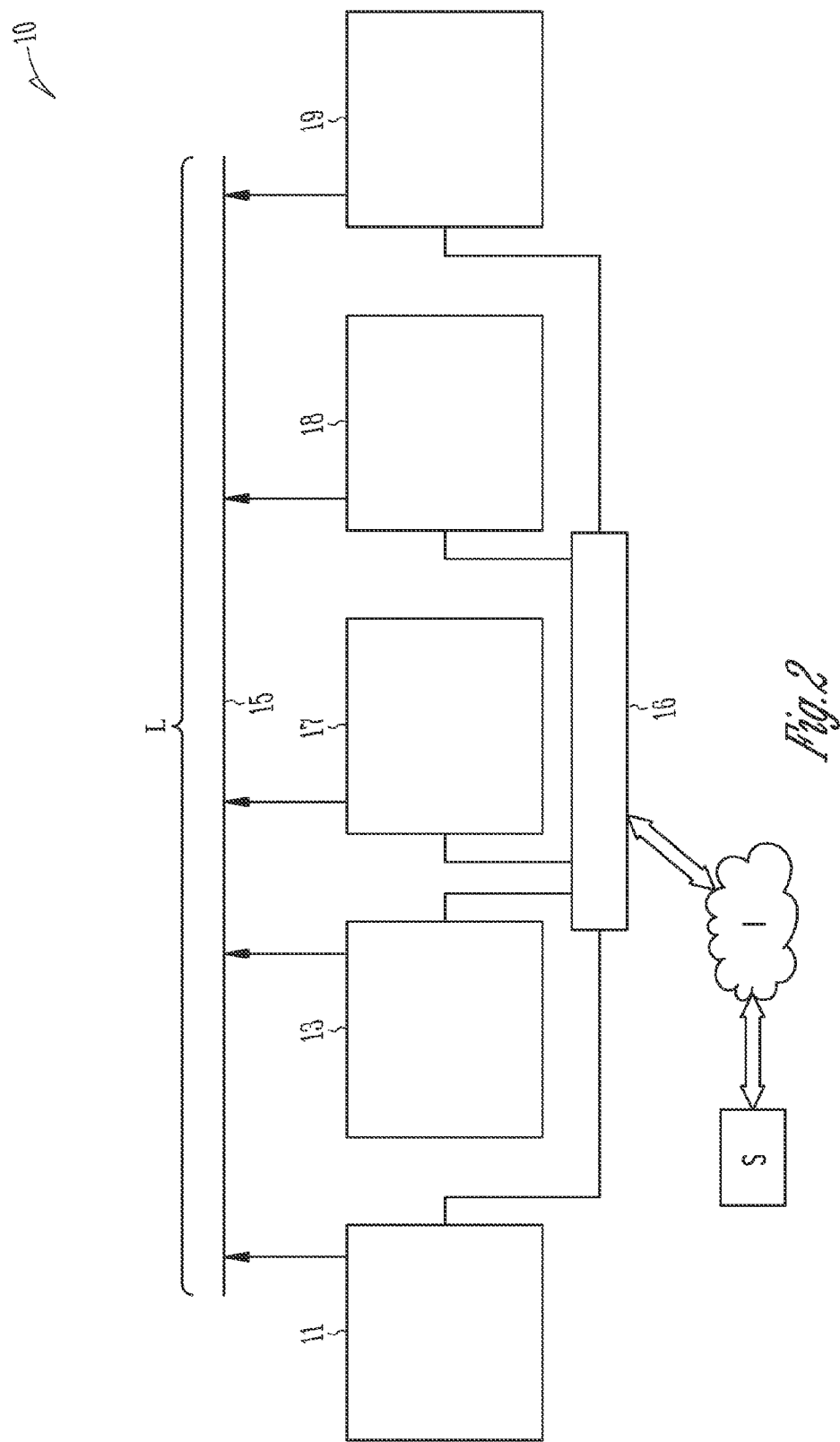
FIG. 2 illustrates an example an example generator management system that includes a plurality of generators.

As shown in FIG. 2, the first generator 11 and the second generator 13 are part of a plurality of generators 11, 13, 17, 18, 19 such that the control 16 determines a time delay to connect any of the plurality of generators 11, 13, 17, 18, 19 to the bus 15 and disconnect any of the plurality of generators 11, 13, 17, 18, 19 from the bus 15. The control varies the time delay based on the load L supplied by the plurality of generators 11, 13, 17, 18, 19.

In the example embodiment illustrated in FIG. 2, it should be noted that the controller 16 determines a time delay to connect any of the plurality of generators 11, 13, 17, 18, 19 to the bus 15 and disconnect any of the plurality of generators 11, 13, 17, 18, 19 from the bus 15. Embodiments are contemplated where the controller 16 determines a time delay to connect just one (or some) of the plurality of generators 11, 13, 17, 18, 19 to the bus 15 and disconnect just one (or some) of the plurality of generators 11, 13, 17, 18, 19 from the bus 15.

In some embodiments, the load L is determined by measuring the real power produced by at least one of the first generator 11 and the second generator 13. Other methods for determining the load L include (i) measuring the mechanical torque on the rotating shaft(s) of the first generator 11 and/or the second generator 13; (ii) measuring current produced by at least one of the first generator 11 and the second generator 13; (iii) measuring reactive power produced by at least one of the first generator 11 and the second generator 13; and (iv) directly measuring similar characteristics at the load (among other forms of power measurement).

The example generator management systems 10 described herein may permit starting and stopping of generators based on the varying requirements of the load where (i) the amount of time may be varied before an additional generator is started and connected to the bus; and/or (ii) the amount of time may be varied before a generator is disconnected from the bus and stopped. Connecting or disconnecting generators according to a variable (and appropriate) amount of time may avoid relatively long start delays that would otherwise be associated with typical fixed amount of time generator starting.

The example generator management systems 10 described herein also may permit starting a variable (and appropriate) number of not operating generators and connecting them to the bus. Therefore, unnecessary starting of the generators may be avoided thereby reducing fuel consumption and undesired wear and tear on the generators.

In addition, the example generator management systems 10 described herein may improve the ability to coordinate with downstream load add/shed systems and over-current protection devices through the variety of possible arrangements for the load L.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A generator management system comprising:
   a first generator:
   a second generator;
   a bus that connects the first generator and the second generator to a load; and
   a control that determines a time delay to connect the first generator and second generator to the bus and disconnect the first generator and second generator from the bus, wherein the control continuously monitors the instantaneous load supplied by the first generator and the second generator and varies the time delay based on the monitored instantaneous load supplied, wherein the control determines the time delay to connect the first generator and second generator to the bus and disconnect the first generator and second generator from the bus based on a relationship between the load supplied by any of the connected first generator and second generator and a set point stored in the control.

2. The generator management system of claim 1, wherein the control determines the time delay to connect at least one of the first generator and the second generator based on a factor that is proportional to the reciprocal of the square of the difference between the load supplied by the first generator and the second generator and a set point stored in the control.

3. The generator management system of claim 1, wherein the control determines the time delay to connect at least one of the first generator and the second generator based on a factor that is proportional to the difference between a set point stored in the control and the load supplied by the first generator and the second generator.

4. The generator management system of claim 1, wherein the control determines the time delay to connect at least one of the first generator and the second generator by obtaining a time from a predetermined set of data stored within the control based on the load supplied by the first generator and the second generator.

5. The generator management system of claim 1, wherein the control increases the time delay to connect at least one of the first generator and the second generator as the load supplied by the first generator and the second generator decreases.

6. The generator management system of claim 1, wherein the control decreases the time delay to connect at least one of the first generator and the second generator as the load supplied by the first generator and the second generator increases.

7. The generator management system of claim 1, wherein the control determines the time delay to disconnect at least one of the first generator and the second generator based on a factor that is proportional to the square of the difference between the load supplied by the first generator and the second generator and a set point stored in the control.

8. The generator management system of claim 1, wherein the control determines the time delay to disconnect at least one of the first generator and the second generator based on a factor that is proportional to the difference between the load supplied by the first generator and the second generator and a set point stored in the control.

9. The generator management system of claim 1, wherein the control determines the time delay to disconnect at least one of the first generator and the second generator by obtaining a time from a predetermined set of data stored within the control based on the load supplied by the first generator and the second generator.

10. The generator management system of claim 1, wherein the control increases the time delay to disconnect at least one of the first generator and the second generator as the load supplied by the first generator and the second generator increases.

11. The generator management system of claim 1, wherein the control decreases the time delay to disconnect at least one of the first generator and the second generator as the load supplied by the first generator and the second generator decreases.

12. The generator management system of claim 1, wherein the control determines the time delay to connect the first generator and second generator to the bus and disconnect the first generator and second generator from the bus, wherein the control varies the time delay based on a difference between the load supplied by the first generator and the second generator and a set point stored within the controller.

13. The generator management system of claim 12, wherein the set point stored within the control is a load level.

14. The generator management system of claim 12, wherein the set point stored within the control is a percentage of a maximum output capacity of the first generator and the second generator.

15. The generator management system of claim 1, wherein the control also controls the operating parameters of at least one of the first generator and the second generator.

16. The generator management system of claim 1, wherein the control is connected to a network such that the control is able to change operating parameters of at least one of the first generator and the second generator based on data received from the network.

17. The method of claim 16, wherein network is the Internet.

18. The method of claim 16, wherein changing the operating parameters includes changing the factors that determine the time delay to connect at least one of the first generator and the second generator to the bus and disconnect at least one of the first generator and the second generator from the bus.

19. The generator management system of claim 1, wherein the first generator and the second generator are part of a plurality of generators such that the control determines a time delay to connect any of the plurality of generators to the bus and disconnect any of the plurality of generators from the bus, wherein the control varies the time delay based on the load supplied by the plurality of generators.

20. The generator management system of claim 1, wherein the load is determined by measuring the real power produced by at least one of the first generator and the second generator.

* * * * *